L. J. TRIPP.
DRYING KILN.
APPLICATION FILED OCT. 17, 1906.
Reissued Feb. 20, 1912. 13,372.
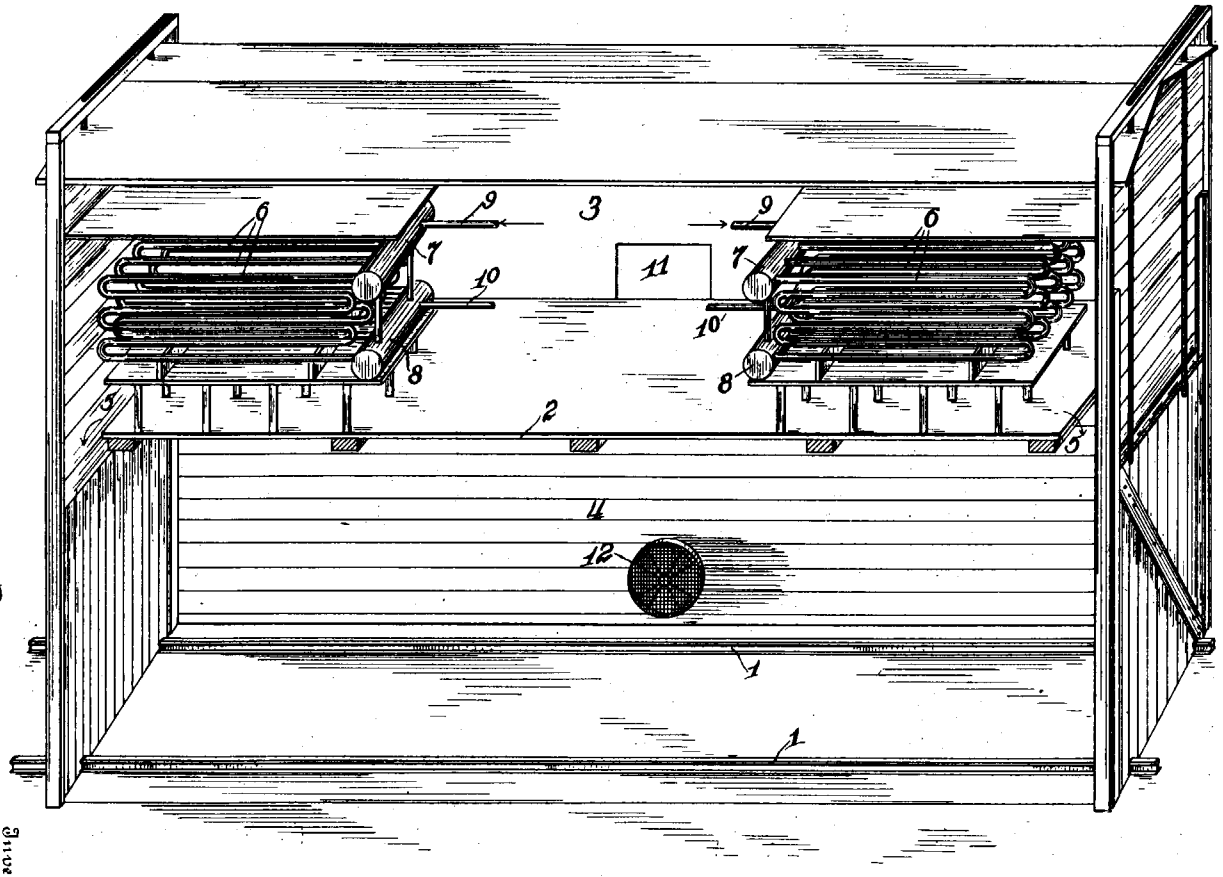
Inventor
Lewis J. Tripp
Witnesses
Lloyd W. Patch.
A. A. Hammond
By Thos. G. Du Bois & Co.
Attorneys
COLUMBIA PLANOGRAPH CO., WASHINGTON, D. C.

UNITED STATES PATENT OFFICE.

LEWIS J. TRIPP, OF MESICK, MICHIGAN.

DRYING-KILN.

13,372. Specification of Reissued Letters Patent. Reissued Feb. 20, 1912.

Original No. 833,011, dated October 9, 1906, Serial No. 324,687. Application for reissue filed October 17, 1906. Serial No. 339,586.

*To all whom it may concern:*

Be it known that I, LEWIS J. TRIPP, a citizen of the United States, residing at Mesick, in the county of Wexford and State of Michigan, have invented certain new and useful Improvements in Drying-Kilns, of which the following is a specification.

My invention relates to an improvement in drying-kilns, and is more particularly adapted for the drying of all kinds of wooden-ware; and it consists in a room or chamber divided horizontally into two compartments, the lower of which is preferably provided with tracks to receive a truck upon which the material to be dried is carried into and out of the kiln, and the upper compartment is provided with drying-coils or pipes, with a cold-air duct at or near the center and air-passages at each end, with means at or near the center of the lower compartment or chamber for exhausting the air therefrom and in so doing creating a uniform temperature throughout and a perfect circulation of dry air.

My invention further consists in certain novel features of construction and combinations of parts, which will be hereinafter described and pointed out in the claims.

The accompanying drawing is an interior view of the kiln, showing in perspective the arrangement of heating and circulating means and the division of the kiln into two compartments, one above the other.

The building may be of any size and dimensions to suit the requirements and is preferably provided with a door at each end for the entrance and exit of a truck, (not shown) which is adapted to travel on tracks 1, 1, on the floor of the kiln. At a suitable elevation above the floor, the upper floor 2 is provided, thus dividing the interior of the kiln into an upper and lower compartment 3 and 4, respectively. This upper floor 2 preferably extends from side to side of the building, but leaves an air-space 5 at each end, as shown, for the circulation of the hot air downward from the upper compartment. In this upper compartment are arranged an adequate number of steam-pipes 6, 6. There are preferably two set of pipes, one at each end, and the ends of these pipes are provided with headers 7 and 8, the upper headers 7 being intended to receive the steam from the boiler, as indicated by the arrows, through the pipes 9, 9, and the lower headers to return the steam and hot water to the boiler through pipes 10, 10. The pipes from the upper headers 7, 7, are coiled back and forth several times and finally discharge into the lower headers 8, 8.

Air enters at some central point, as at 11, in the upper compartment and circulates in both directions through the drying coils and around at the ends of the upper compartment through the air-spaces 5, 5, thus entering the lower compartment from its opposite ends, where it circulates uniformly through the contents of the truck, it being exhausted by a fan 12, placed at or about midway of the lower compartment of the kiln.

The stock to be dried is placed on the cars (not shown) and pushed in at either end of the kiln, after which the doors of course, are closed, and the operation of heating and circulating the air proceeds as long as it is necessary to continue the drying process.

I have heretofore tested the efficiency of this kiln and find that it affords a perfect and uniform heating and circulating, distribution, and application of the air. At the same time the kiln is simple in its construction and economical in the parts required and in the heating and distribution of the air.

Slight changes might, of course, be made in the form and arrangements of the several parts described without departure from the spirit and scope of my invention, and hence I do not wish to limit myself to the exact construction herein set forth, but:—

Having fully described my invention, what I claim as new and desire to secure by Letters Patent, is:—

1. A kiln comprising a drying chamber through which the material to be dried is conducted, a heating chamber, having heaters at each end, communicating with a drying chamber, a central source of air supply located in one chamber and a central source of air exhaust located in the other chamber whereby the air supply is drawn through the heating chamber from a central point of supply in opposite directions and drawn in both directions toward the center of the drying chamber.

2. A kiln divided horizontally into two chambers which communicate with each other at their outer ends, one chamber having a heater at each end, said last named chamber having a source of air supply common to both heaters and the other chamber an exhaust at the center whereby air is caused to circulate in opposite directions in the two chambers.

3. A dry-kiln comprising a house divided horizontally into two chambers, air-passages at opposite points in the floor of the upper chamber, means located at opposite ends of the upper chamber for heating the air and inlets and outlets for the air centrally located in the upper and lower compartments whereby the cold air is heated during its passage to the air-outlets in the floor of the upper compartment whereupon it is drawn endwise in opposite directions through the lower compartment and discharged at or near the center thereof.

4. A dry-kiln comprising a house divided horizontally into two compartments in communication with each other at opposite points, one compartment having heating means therein adjacent to said communicating points, an air-inlet in the compartment for the heating apparatus located at a central point and an air-exhaust in the other compartment located at a central point whereby the cold air is heated on its way to the communicating-points and sent in opposite directions through the other chamber so that the stock is subjected to an even temperature all through the kiln.

5. A dry kiln comprising a house divided horizontally in two compartments in communication with each other at opposite points, one compartment having heating coils therein adjacent to said communicating points, an air inlet in the compartment for the heating apparatus located at a central point, and an exhaust in the other compartment located at a central point whereby the cold air is drawn through the heating coils and heated on its way to the communicating points and sent in opposite directions through the other chamber so that the stock is subjected to an even temperature all through the kiln.

In testimony whereof I have signed my name to this specification in the presence of two subscribing witnesses.

LEWIS J. TRIPP.

Witnesses:

ALEXANDER T. ROSS,
ROY BARKINBUS.

Copies of this patent may be obtained for five cents each, by addressing the "Commissioner of Patents, Washington, D. C."